July 1, 1930.  A. E. NORRIS  1,769,269
DITCHER BACK FILLER
Filed Sept. 19, 1927  2 Sheets-Sheet 2
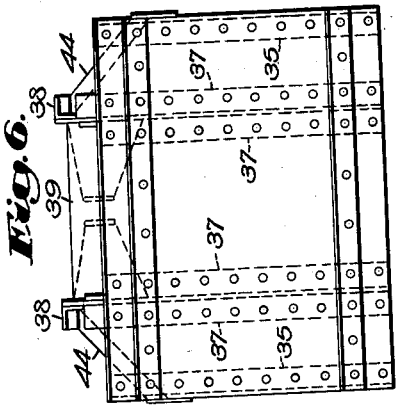
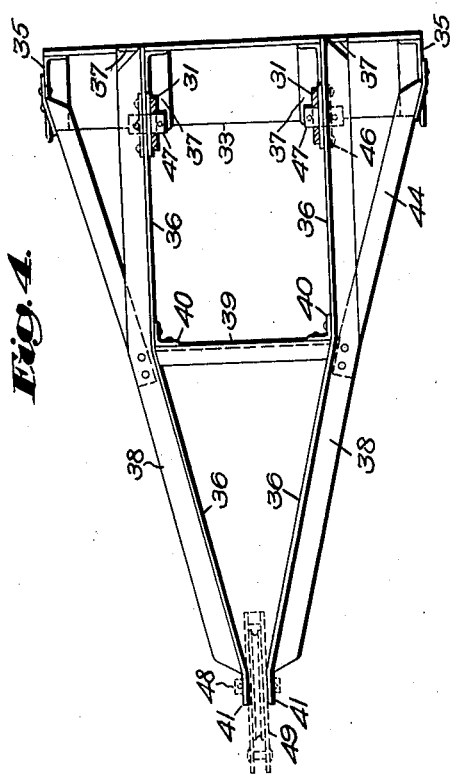
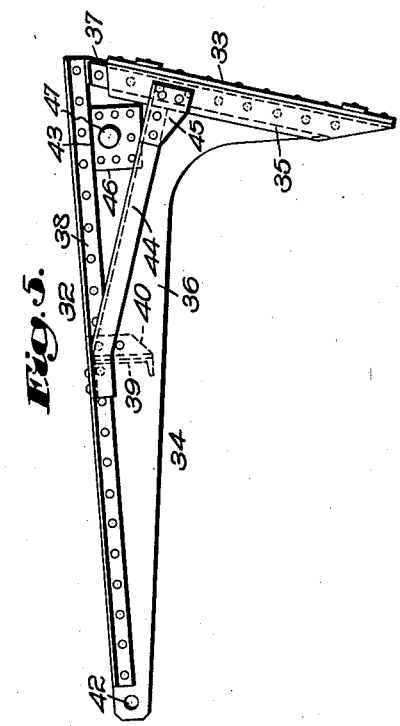
Inventor:
Almon E. Norris
by Emery, Booth, Janney & Varney
Att'ys Patented July 1, 1930

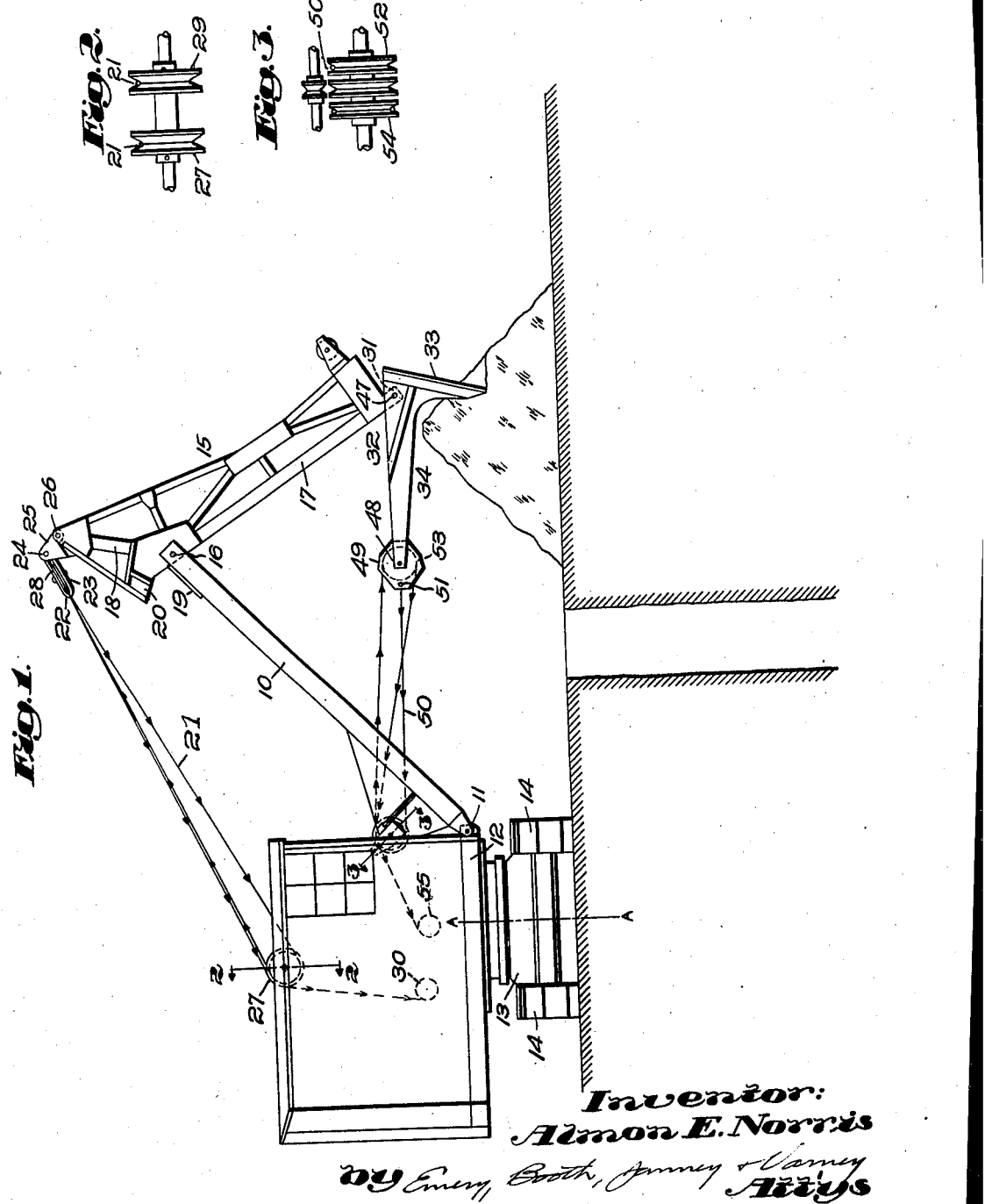

1,769,269

UNITED STATES PATENT OFFICE

ALMON E. NORRIS, OF BROOKLINE, MASSACHUSETTS

DITCHER BACK-FILLER

Application filed September 19, 1927. Serial No. 220,320.

This invention relates to a ditcher backfiller, having a hoe for scraping back into a ditch the earth previously removed therefrom, by the machine arranged as a ditcher.

The invention will be best understood by reference to the following description, when taken in connection with the accompanying drawings of one specific embodiment thereof, while its scope will be more particularly pointed out in the appended claims.

In the drawings:

Fig. 1 is an elevation of a ditcher backfiller exemplifying the invention;

Fig. 2 is a sectional view, on an enlarged scale, on line 2—2 of Fig. 1;

Fig. 3 is a sectional view, on an enlarged scale, on line 3—3 of Fig. 1;

Fig. 4 is a plan of the hoe, on an enlarged scale;

Fig. 5 is a side elevation of the hoe; and

Fig. 6 is an end elevation of the same.

Referring to the drawings, and to the embodiment of the invention which is selected for exemplification, and having reference at first to Fig. 1, there is shown a ditcher backfiller having a boom 10, pivoted as at 11 to turn about a horizontal axis on an appropriate support 12, herein a turn-table pivoted to swing about a vertical axis A—A on a traveling base 13, having traction members, such as self-laying tracks 14. A lever 15, pivoted at 16 on the boom 10 to turn about a horizontal axis, has a long arm 17 and a short arm 18.

Upward swinging movement of the lever relatively to the boom is limited by cooperating abutments 19 and 20, presented by the boom and the lever, respectively. The lever and the boom are operated by a hoisting cable 21, one end of which is anchored at 22 on a block 23, pivoted at 24 on a rocker 25, which is appropriately mounted as by a pivotal pin 26 on the upper end of the arm 18 of the lever 15. The hoisting cable extends from its anchored end, as shown by the arrows thereon, to and part-way around a sheave 27, thence in the opposite direction to and part-way around a sheave 28 carried by the block 23, thence in the first direction to and part-way around a sheave 29, and thence to a drum 30, to which the remaining end of the cable is secured.

The outer end of the long arm 17 of the lever 15 presents ears 31, on which may be hung either a scoop for digging a ditch, or a hoe 32, now to be described, for scraping the earth back into the ditch. Referring to Fig. 5, the hoe in the present example comprises generally a scraper 33 and an arm or handle 34. Herein, the scraper 33 is a flat, rectangular plate, whose vertical edges are reinforced by angle bars 35, suitably secured thereto, as by riveting. The arm 34 extends laterally from the scraper, and comprises two plates 36, suitably secured to the scraper, as by pairs of angle bars 37, riveted to the plates, as well as to the scraper. These bars, as well as the plates, provide further reinforcement for the blade. The upper longitudinal edges of the plates 36 are reinforced by angle bars 38, suitably secured thereto as by riveting.

As shown in Fig. 4, the plates 36 are in part parallel with each other, and perpendicular to the scraper 33. Some distance from the scraper, the blades are connected to each other by a horizontal brace, herein a deep channel bar 39, secured in place as by angle brackets 40 riveted to the plates, as well as to the bar. Beyond the brace, the plates 36 converge, and at their terminal portions, they present parallel ears 41, provided with holes 42, the purpose of which will appear presently. Likewise, holes 43 are provided in the plates adjacent the upper portion of the scraper, for a purpose which will appear presently. Diagonal braces 44 are attached to the angle bars 35, as by gusset plates 45 at one pair of ends, while the other ends are bent parallel with the angle bars 28, to which they are riveted. Herein, the plates 36 are reinforced about the holes 43 by plates 46.

The hoe is hung on the ears 31 of the arm 17 (see Fig. 1) by pivot pins 47 (see Fig. 4), which extend through said ears, as well as through the plates 36 and 46. The holes 42 in the ears 41 receive a pin 48 for a block 49 interposed between said ears. A hauling cable 50 (see Fig. 1) is anchored as at 51 on the block, and extends thence in the directions of the arrows thereon to and part-way around a sheave 52 (see Fig. 3) carried by the boom, thence in the opposite direction to and part-way about a sheave 53 in the block 49, thence in the first direction over a sheave 54 (see Fig. 3), and finally to and about a drum 55, to which the remaining end of the cable is secured.

The operation will now be described, reference being had to Fig. 1. Starting with the parts in the position shown in Fig. 1, the hauling cable 50 is wound in onto the drum 55, and the hoisting cable 21 is correspondingly paid out, as a result of which, the hoe is pulled horizontally toward the machine with as much as is desired of the weight of the lever 15 and the boom 10 upon the hoe, it being understood, of course, that the outer end of the lever swings inwardly and downwardly about the pivot 16, and that the upper end of the boom swings inwardly and upwardly about the pivot 11. By proper manipulation of the two cables, the hoe can be caused to travel in any desired path across the pile of earth, and to scrape it into the trench or ditch. Reverse travel of the hoe is caused by winding in on the hoisting cable, and paying out on the hauling cable, in the proper proportions to bring the hoe to a new starting point with reference to the pile of earth.

Having thus described one embodiment of the invention, but without limiting myself thereto, what I claim and desire by Letters Patent to secure is:

1. In a ditcher back-filler, the combination of a hoe having a generally upright scraper and a generally horizontal arm, the latter comprising two spaced members, a block interposed between said members and having a sheave, a supporting arm on which said members are pivoted to turn about a horizontal axis, a boom on which said supporting arm is pivoted to swing about a horizontal axis, a support on which said boom is pivoted to swing about a horizontal axis, means for swinging said supporting arm vertically, a drum and a sheave carried by said support, and a hauling cable attached to said block, and extending therefrom inwardly to and part way around the second-mentioned sheave, thence outwardly to and part way around the first-mentioned sheave, and thence inwardly to and about said drum to which said cable is secured.

2. In a ditcher back-filler, the combination of a hoe having a generally upright scraper and a generally horizontal arm, the latter comprising two spaced members, a block interposed between said members and having a sheave and a pin on which said sheave turns, said pin extending through and being supported by said members, a supporting arm on which said members are pivoted to turn about a horizontal axis, a boom on which said supporting arm is pivoted to swing about a horizontal axis, means for swinging said supporting arm vertically, a drum and a sheave carried by said support, and a hauling cable attached to said block and extending therefrom inwardly to and part way about the second-mentioned sheave, thence outwardly to and part way about the second-mentioned sheave, and thence inwardly to and about said drum to which said cable is secured.

In testimony whereof, I have signed my name to this specification.

ALMON E. NORRIS.